March 5, 1957 R. E. BROWN 2,783,653
VARIABLE SPEED TURNTABLE
Filed March 26, 1953 4 Sheets-Sheet 2
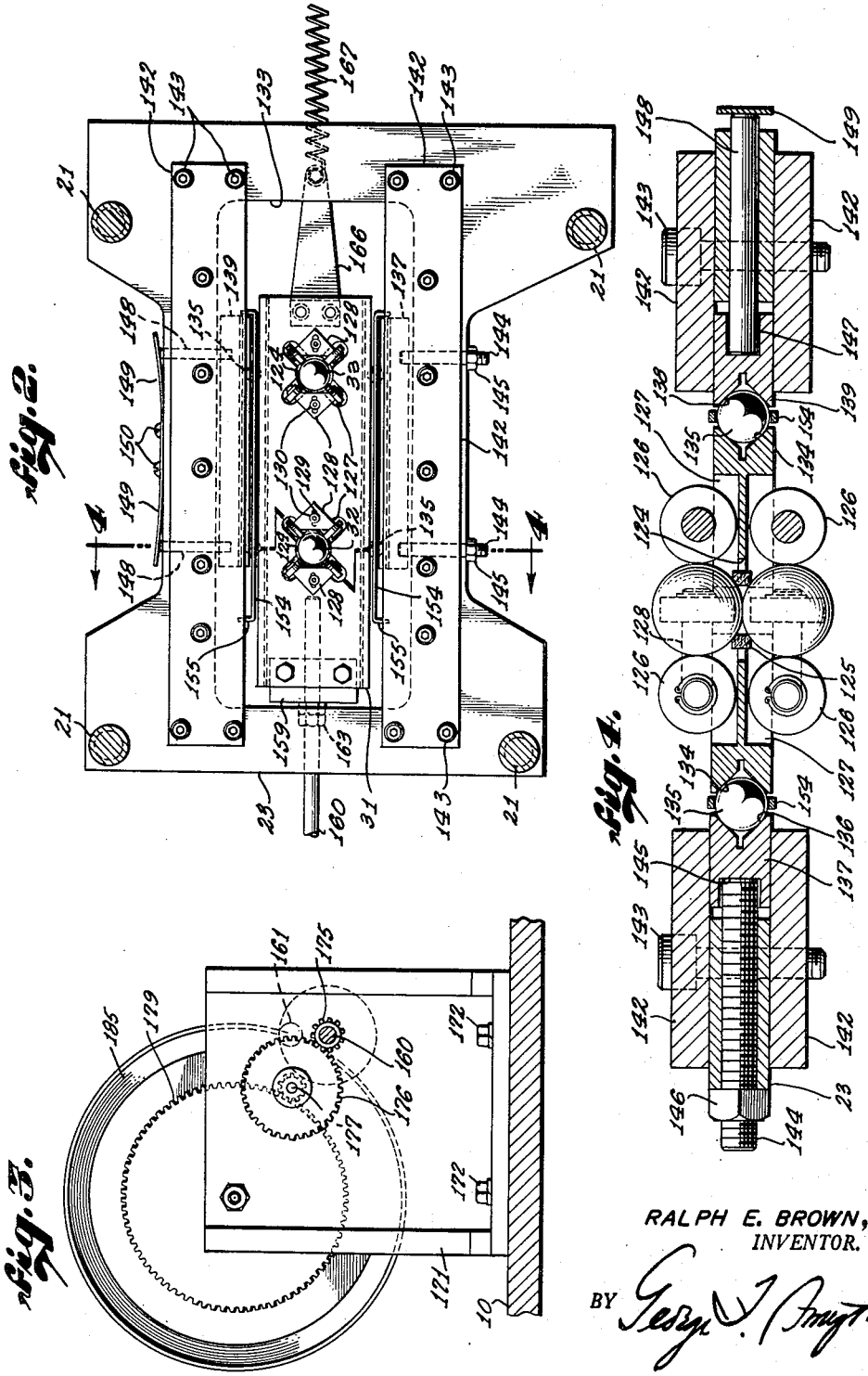
RALPH E. BROWN,
INVENTOR.
BY
ATTORNEY.

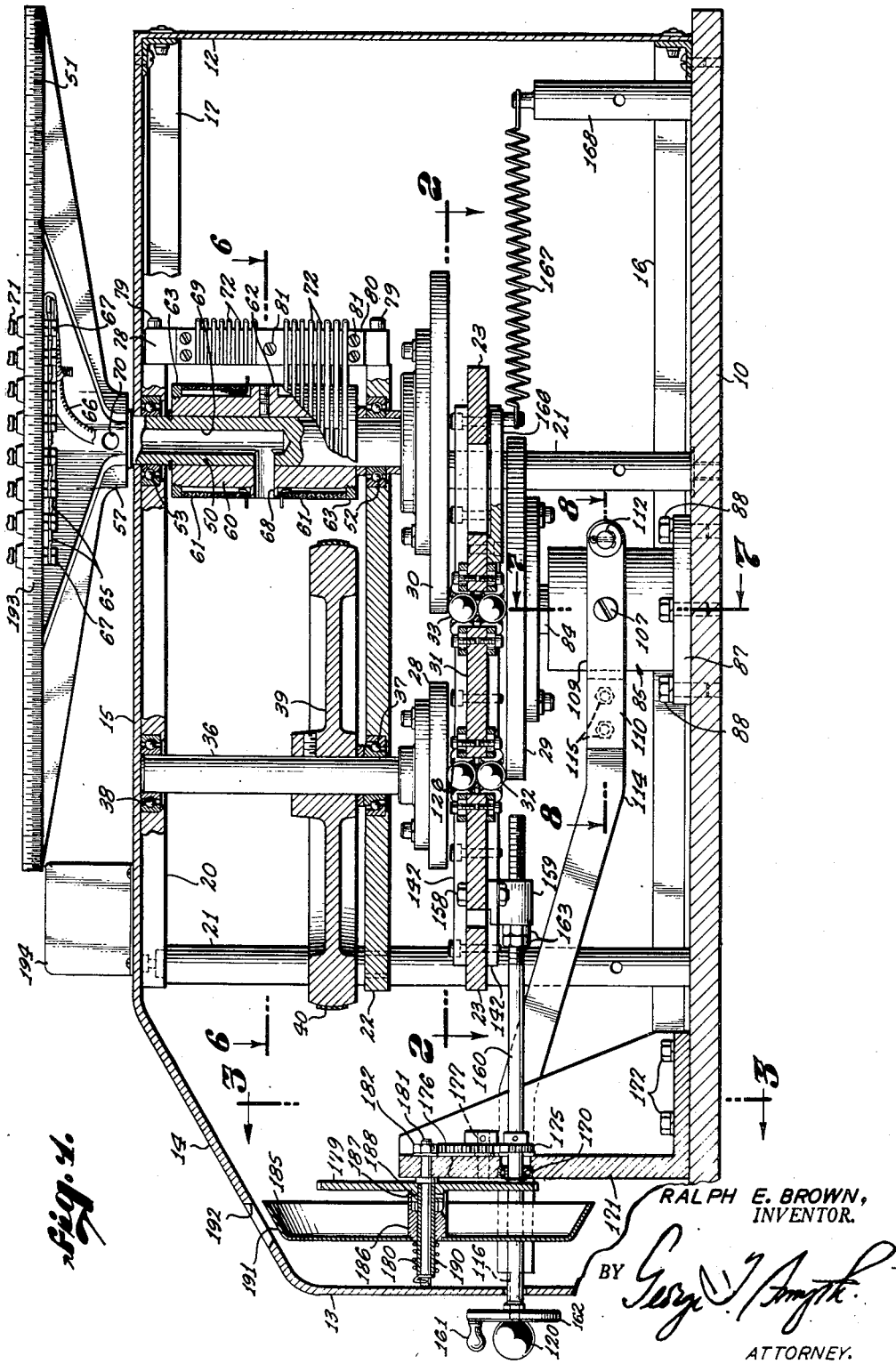

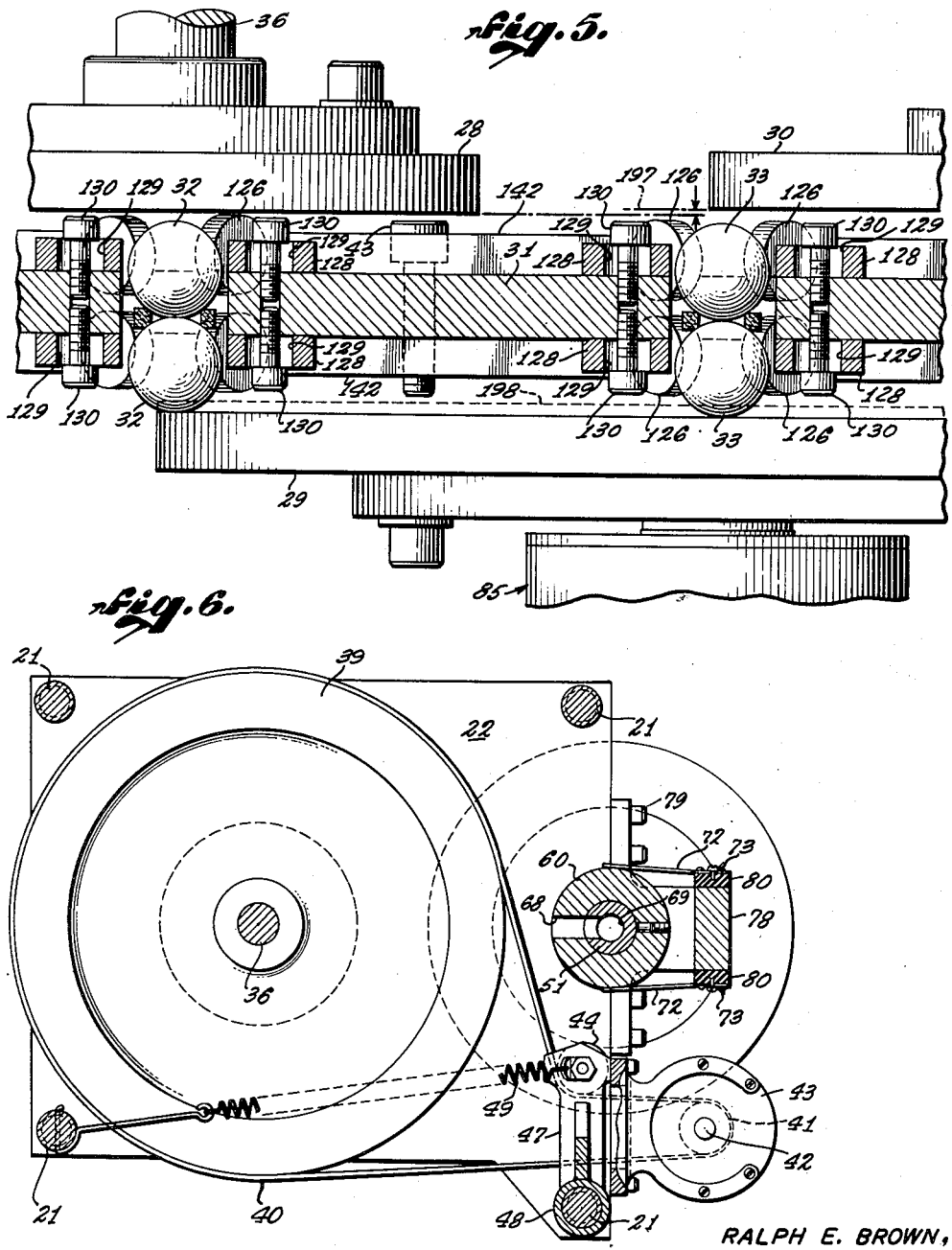

March 5, 1957
R. E. BROWN
2,783,653
VARIABLE SPEED TURNTABLE
Filed March 26, 1953
4 Sheets-Sheet 4
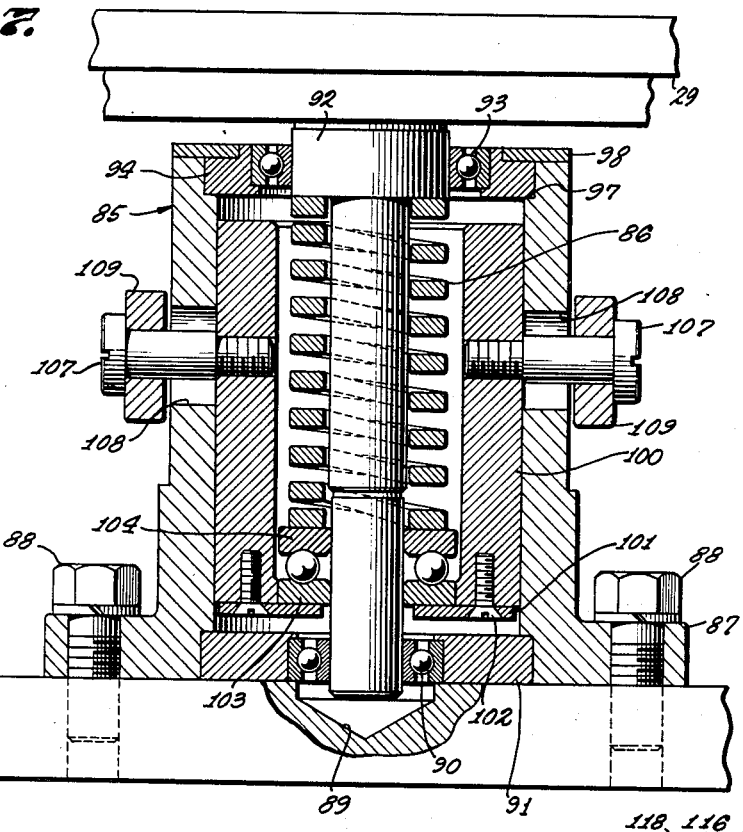
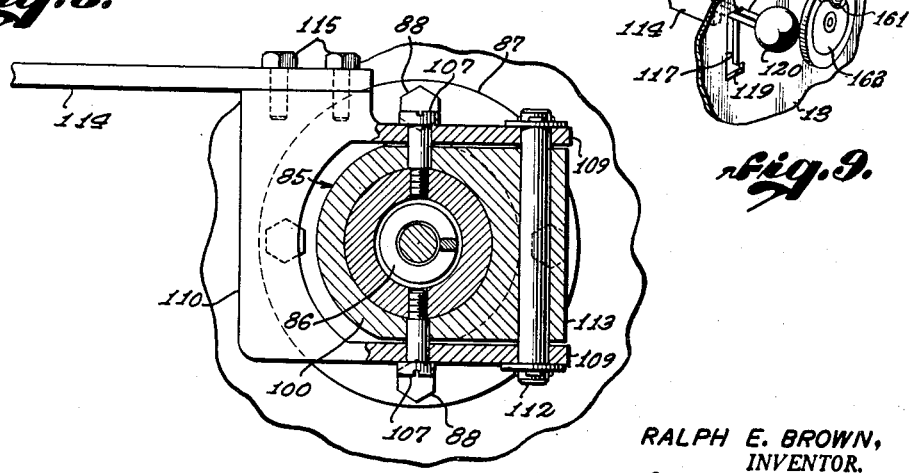
RALPH E. BROWN,
INVENTOR.
BY *George W. Smyth*
ATTORNEY.

United States Patent Office 2,783,653
Patented Mar. 5, 1957

2,783,653

VARIABLE SPEED TURNTABLE

Ralph E. Brown, Los Angeles, Calif., assignor to Genisco, Inc., Los Angeles, Calif., a corporation Application March 26, 1953, Serial No. 344,721

15 Claims. (Cl. 74—198)

This invention relates to variable speed rotary devices and is directed to the general problem of making such a device adjustable by exceedingly small increments under close, accurate control over a wide range of speeds. While the invention may be employed for various specific purposes in various fields, it has been initially embodied in a variable speed turntable for testing rotation-responsive devices with particular reference to gyroscopes. This initial embodiment of the invention will be described herein for the purpose of disclosure and will provide adequate guidance for those skilled in the art who may have occasion to apply the underlying principles to other specific purposes.

A wide range of speed variation is afforded by the invention through the employment of a train of rotary discs successively interconnected by pairs of balls, in combination with control means to shift the pairs of balls relative to the disc axes. The control means includes a shiftable carriage on which the pairs of balls are rotatably mounted. Preferably the range of speed variation is extended down to zero speed by providing a range of adjustment for at least one of the pairs of balls that includes a ball position on the axis of a disc.

While any number of discs may be employed in various practices of the invention, the present embodiment incorporates three discs operatively interconnected in series by two intervening pairs of balls. The three discs comprise a first input disc, a second intermediate disc and a third output disc. This arrangement provides for transmission of rotation from the input disc to the output disc in two successive stages with either increase or decrease in speed at each stage. In the present practice of the invention, speed is reduced at each stage to permit an exceedingly slow speed of rotation of the output disc when desired.

One problem in the attainment of efficient operation of such a device is to provide means on the carriage to confine the pairs of balls and yet afford complete freedom for the balls to rotate so that the balls will transfer power with minimum frictional loss and will not frictionally resist speed-changing movement of the carriage. This problem is met by confining each ball of a pair of balls by a set of equally spaced rollers and by so positioning the rollers that their planes of rotation are at angles of 45 degrees from the direction of travel of the ball carriage. This arrangement has been found to eliminate any sliding or dragging action between the two balls of a pair, or between the pairs of balls and the associated discs, or between the balls and the associated sets of confining rollers.

Another problem is to eliminate backlash or lost motion for the sake of accuracy and close speed control. As will be explained, this problem is solved by stressing the ball-confining rollers, by providing stressed guide means for the ball carriage and by providing stressed means for moving the carriage.

A third problem arises from a certain troublesome tendency for flat spots to develop on the coacting balls. Pressure of appreciable magnitude between the balls and the disc surfaces is necessary for the balls to serve their basic purpose of transmitting motion and it has been discovered that the balls tend to flatten when held stationary under such pressure while the device is idle. This problem is met by making at least one disc on one side of each pair of balls axially movable for the purpose of relieving the balls of pressure during idle periods.

In the preferred form of the invention this feature is included in an arrangement for applying substantially equal operating pressure to the two sets of balls, as will be explained.

A further feature of the invention is the provision of means for accurately regulating the output of the device at predetermined speeds for accurately testing the speed-of-turn indications of gyroscopes. For this purpose means for indicating approximate speeds or speed ranges in response to the positioning of the ball carriage is combined with stroboscopic means for arriving at exact speeds within the indicated ranges.

The various features and advantages of the invention will be apparent in the following detailed description of the presently preferred embodiment of the invention considered with the accompanying drawings.

In the drawings, which are to be regarded as merely illustrative:

Figure 1 is a view partly in side elevation and partly in section of the preferred embodiment of the invention as adapted for testing gyroscopic rate-of-turn indicating devices;

Figure 2 is a horizontal section taken as indicated by the line 2—2 of Figure 1;

Figure 3 is a transverse vertical section taken as indicated by the line 3—3 of Figure 1;

Figure 4 is an enlarged transverse section taken as indicated by the line 4—4 of Figure 2;

Figure 5 is a fragmentary view, partly in section and partly in side elevation, showing the ball carriage at its zero speed position;

Figure 6 is a horizontal section taken as indicated by the line 6—6 of Figure 1;

Figure 7 is an enlarged vertical sectional view taken as indicated by the line 7—7 of Figure 1;

Figure 8 is an enlarged horizontal section taken as indicated by the line 8—8 of Figure 1; and Figure 9 is a fragmentary perspective view of manually operable means for controlling the application of operative pressure to the pairs of balls.

The selective embodiment of the invention shown in the drawings has a housing including a heavy base plate 10, two opposite side walls 11, a back wall 12, a front wall 13, and a sloping wall 14 that connects the front wall with a top wall 15. The upright walls are connected to the base plate 10 by angle bars 16 and similar angle bars 17 connect the upright walls to the top wall 15. Preferably the top wall 15 is reinforced by a heavy inner plate 20. The housing may be internally reinforced by four columns 21 that extend from the base plate 10 to the top reinforcing plate 20 and serve the further purpose of supporting two horizontal plates 22 and 23 that are positioned at different intermediate levels inside the housing.

The principal moving parts of this embodiment of the invention include: a first downwardly facing input disc 28; a second upwardly facing intermediate disc 29; a third downwardly facing output disc 30; a carriage in the form of a plate 31; a first pair of transmission balls 32 rotatably mounted on the carriage 31 to transmit rotation from the input disc 28 to the intermediate disc 29; and a second pair of transmission balls 33 rotatably mounted on the carriage to transmit rotation from the intermediate disc 29 to the output disc 30. Preferably the axes of the three discs 28, 29 and 30 are in line, all lying in a common vertical plane, and preferably at least one of the three discs overlaps the axis of an associated disc so that at least one of the two pairs of balls may take a zero speed position at which rotation of the input disc 28 will not be transmitted to the output disc 30. In the present construction, the intermediate disc 29 extends across the axes of the input disc 28 and of the output disc 30 and the output disc extends across the axis of the intermediate disc, the axis of the intermediate disc being equidistant between the other two axes. Figure 1 shows the carriage 31 at its zero speed position with the pair of balls 32 at the axis of the input disc 28 and the second pair of balls 33 at the axis of the intermediate disc 29. It is apparent that only slight movement of the carriage 31 to the right, as viewed in Figure 1, will result in transmission of rotation from the input disc to the intermediate disc and from the intermediate disc to the output disc, each of the two pairs of balls serving to step down the imparted rate of rotation.

The input disc 28 may be mounted on a vertical shaft 36 journaled in a lower thrust bearing 37 in the horizontal plate 22 and an upper bearing 38 in the top reinforcing plate 20, with the shaft free to shift axially through a short vertical range. Any suitable means may be employed to actuate the shaft 36 in a steady manner. For example, the shaft 36 may be provided with a fly wheel 39 driven by a belt 40. As best shown in Figure 6, the belt 40 may be actuated by a small diameter pulley 41 on an upright shaft 42 driven by a suitable motor 43, and the belt may be maintained under suitable tension by an idler pulley 44. In the construction shown, the idler pulley 44 is carried by an arm 47 having a sleeve portion 48 rotatably mounted on one of the columns 21 and a suitable coiled spring 49 extends from the arm to a second column 21 to pull the arm in a direction to tighten the belt 40.

The output disc 30 may be mounted on the lower end of an upright shaft 50 that extends through the top of the housing and carries on its upper end a suitable circular turntable 51 with a hub 57, the turntable being adapted to hold instruments that are to be tested. The shaft 50 is mounted in a lower bearing 52 in the horizontal plate 22 and an upper bearing 53 in the top reinforcement plate 20 with substantially no freedom for axial movement of the shaft.

It is contemplated that a gyroscopic instrument to be tested will be suitably clamped on the turntable 51 and will be connected by a plurality of conductors to a suitable indicating means (not shown) outside the test apparatus to permit observation of the signal generated by the gyroscopic instrument in response to rotation of the turntable. For the purpose of providing the required electrical connections, the shaft 50 is embraced by a sleeve 60 on which is mounted a plurality of slip rings 61. In the construction shown, the sleeve 60 is formed with a central peripheral rib 62 and is threaded at its upper and lower ends for engagement by a pair of bushings 63. The various slip rings 61 are stacked in two groups between the two bushings 63 and the intermediate peripheral rib 62.

A plurality of conductors 65 corresponding to the slip rings 61 are incorporated in a suitable cable 66, with the lower ends of the conductors connected to the corresponding slip rings and the upper ends of the conductors connected to corresponding terminals 67 on the turntable. The cable 66 extends through a radial bore 68 into the shaft and through an axial bore 69 in the shaft to a second radial bore 70 in the turntable hub 57. Each of terminals 67 on the turntable is provided with an insulated conductor 71 that is adapted for releasable attachment to a gyroscopic instrument on the turntable.

For cooperation with the slip rings 61, corresponding brushes 72 are suitably mounted adjacent the slip rings and connected to corresponding conductors 73 (Figure 6). In the construction shown, the brushes 72 are carried by a U-shaped bracket 78, the legs of which are secured by screws 79 to the horizontal plate 22 and to the top reinforcing plate 20, respectively, to retain the corresponding bearings 52 and 53 for the shaft 50. The brushes 72 are mounted on insulating strips 80 on opposite sides of the bracket 78, the insulating strips being attached to the bracket by suitable screws 81.

It is contemplated that the intermediate disc 29 will be mounted for axial movement through a somewhat greater range than the input disc 28 so that the intermediate disc may be lowered from the operating position shown in Figure 1 to an alternate idle position carrying the pair of balls 32 out of contact with the input disc 28 and, of course, also carrying the pair of balls 33 out of contact with the output disc 30. Preferably suitable yielding means is provided to cause the intermediate disc 29 to exert upward pressure in its operating position shown in Figure 1, with the upward pressure in excess of the weight carried by the input disc 28 so that a portion of the upward pressure will be transmitted through the pair of balls 33 to the output disc 30. The upward pressure may amount to approximately twice the weight imposed by the input disc 28 on the pair of balls 32 to equalize the pressure to which the two pairs of balls 32 and 33 are subjected when the apparatus is in operation. For this purpose, a shaft 84 carrying the intermediate disc 29, is journaled in an upright cylinder 85 and is supported by a suitable spring 86 (Figure 7) inside the cylinder.

In the construction shown in the drawings, the upright cylinder 85 has a bottom flange 87 to receive screws 88 for anchoring the cylinder to the base plate 10 and the base plate is bored and counterbored to provide a clearance space 89 below the lower end of the shaft 84. The lower end of the shaft 84 is journaled in a ball bearing 90 in a bearing ring 91 at the bottom of the cylinder 85 and an enlarged upper portion 92 of the shaft is journaled in a second bearing 93 in a bearing ring 94 at the top of the cylinder. The second bearing ring 94 rests on an inner annular shoulder 97 and is held in place by a suitable retaining ring 98.

Slidably mounted in the cylinder 85 is a second cylinder 100 that is adapted to support the lower end of the spring 86 with the upper end of the spring pressing against the under surface of the enlarged portion 92 of the shaft 84. In the construction shown, a thin ring 101 mounted on the bottom end of the inner cylinder 100 by suitable screws 102 supports the lower race 103 of a ball bearing and the upper race 104 of the ball bearing supports the spring 86.

Any suitable means may be provided to raise and lower the inner cylinder 100 thereby to raise and lower the intermediate disc 29 by means of the spring 86. In the construction shown, a pair of headed studs 107 extend through corresponding longitudinal slots 108 in the cylinder 85 and are engaged at their outer ends by the two arms 109 of a yoke 110. As best shown in Figure 8, the outer ends of the yoke arms 110 are pivotally supported by the fixed cylinder 85 and for this purpose are mounted on the opposite ends of a cross pin 112 that extends through a laterally projecting portion 113 of the cylinder.

It is apparent that rocking the yoke 110 on the cross pin 112 as a fulcrum will result in raising and lowering the inner cylinder 100 to raise and lower the intermediate disc 29. The yoke 110 may be rocked, for example, by means of a forwardly extending arm 114 that is mounted on the yoke by suitable screws 115. A reduced end portion 116 of the arm 114 extends through a vertical slot 117 (Figure 9) in the front wall 13 of the housing. The vertical slot 117 has a horizontal extension 118 at its upper end and a second horizontal extension 119 at its lower end. At the outer end of the arm 114 is a suitable handle or knob 120 by means of which the reduced end portion 116 of the arm may be shifted to alternate positions in latching engagement with the two horizontal extensions 118 and 119, respectively, of the slot 117. When the lever is latched in the upper horizontal extension 118 at the top of the slot 117, the intermediate disc 29 is supported by the concealed spring 86 in the operating position of the disc shown in Figure 1, and when the arm is at the lower end of the slot 117 in engagement with the horizontal extension 119, the intermediate disc 29 is at a lower idle position with the pair of balls 32 out of contact with the input disc 29 and with the second pair of balls 33 out of contact with the output disc 30. Thus the slot 117 serves as means to latch the arm 114 in either of its two alternate positions.

As heretofore stated, the carriage 31 may be in the form of a plate. In the construction shown in the drawings, the carriage plate 31 has two spaced apertures 124 (Figures 4 and 5) for the two pairs of balls 32 and 33, respectively, the balls of each pair being in mutual contact through the corresponding aperture. Preferably a suitable felt ring 125 is mounted between each pair of balls in peripheral contact with the two balls to serve the purpose of continually removing dust from the ball surfaces.

Each of the balls of the two pairs 32 and 33 is surrounded and retained against horizontal movement by a set of four rollers 126, the carriage plate 31 being cut away to provide a recess 127 to clear each set of rollers. A feature of the invention is the concept of positioning the four rollers 126 of each set at 45 degrees from the direction of travel of the carriage plate. The four rollers may be considered at 45 degrees from the longitudinal axis of the carriage plate either with respect to the axes of the individual rollers or with respect to the planes of rotation of the individual rollers. It has been found that with the four rollers 126 of each pair positioned at 45 degrees from the direction of travel of the carriage and with the carriage traveling along the vertical plane of the axes of the three discs 28, 29 and 30, the two sets of balls rotate freely at any position of adjustment of the carriage plate and rotate freely in response to movement of the carriage, there being no sliding or dragging action at any time between the two balls of each pair or between the balls and the associated discs, or between the balls and the associated sets of rollers 126.

Preferably the rollers 126 of each set are adjustable to permit positioning for pressure contact with the confined balls. For this purpose, the four rollers 126 of each set may be mounted in two opposed pairs on two corresponding brackets 128 (Figure 2) for adjustment relative to the carriage 31, each bracket having an adjustment slot 129 through which extends a suitable retaining screw 130. A preferred assembly procedure is to adjust the four rollers 126 of each set to fit snugly against the circumference of a cylindrical body of slightly smaller diameter than the balls to be confined by the rollers and then to withdraw the cylindrical body for replacement by the corresponding pairs of balls. This procedure insures placing the four rollers of each set under continuous stress that eliminates backlash or lost motion on the part of the two pairs of balls 32 and 33 with respect to the carriage 31.

The carriage 31 is mounted for movement in the plane of a rectangular aperture 133 in the horizontal plate 23 and is suitably guided by the horizontal plate. For the purpose of such guidance, the carriage 31 may be provided with longitudinal V-shaped grooves 134 on each of its two longitudinal side edges for cooperation with a pair of guide balls 135 on each side of the carriage. As best shown in Figure 4, the guide balls 135 on one side of the carriage ride in a V-shaped groove 136 in an adjustable guide member 137 and the guide balls on the other side of the carriage ride in a V-shaped groove 138 in a floating guide member 139.

Each of the two guide members 137 and 139 is slidingly mounted between a pair of retaining plates 142 that are mounted on opposite sides of the horizontal plate 23 by suitable screws 143. The adjustable guide member 137 is held in place by a pair of screws 144, the inner ends of which extend into sockets 145 in the guide member. The two screws 144 are threaded into the horizontal plate 23 and are releasably fixed by lock nuts 146. The floating guide member 139 is formed with sockets 147 to receive the inner ends of a pair of pins 148 that are slidingly mounted in the horizontal plate 23 and extend outward beyond the side edge of the horizontal plate. A suitable leaf spring 149 mounted on the side of the horizontal plate 23 by suitable screws 150 continuously presses inward on the two pins 148 to continuously urge the floating guide member 139 laterally towards the carriage.

Preferably a suitable guard 154 for each of the two pairs of guide balls 135 extends on each side of the carriage 31 between the carriage and the corresponding guide member 137 or 139. Each of the guards 154 is cut away to straddle the pair of guide balls and is bent at each end as shown at 155 in Figure 2, the bent ends being slidingly seated between the corresponding pair of retaining plates 142.

The carriage 31 is connected by bolts 158 to a travelling nut 159 on a control screw 160 that extends through the front housing wall 12 and is actuated by a crank 161 (Figure 9) on a wheel 162. In Figure 1, the carriage 31 is at the zero speed position with the traveling nut 159 in abutment with a stop on the control screw 160 in the form of a pair of lock nuts 163. For the purpose of eliminating backlash, the bracket 166 on the rear end of the carriage 31 is connected by a coiled spring 167 with a vertical post 168 to urge the carriage continuously rearward in opposition to the travelling nut and control screw.

The control screw 160 is journaled in a suitable bearing 170 in an upright bracket 171 that is mounted on the base plate 10 by suitable screws 172. As shown in Figures 1 and 3, a small pinion 175 on the control screw 160 meshes with a gear 176, which gear is mounted on a stub shaft 177 that extends forward through the bracket 171. Keyed to the forward end of the stub shaft 177 is a second pinion 178 that meshes with a relatively large gear 179. The large gear 179 is keyed to a sleeve 180 that is journaled on a fixed spindle 181, the spindle extending forward from the bracket 171 and being fixedly secured thereto by a nut 182. A speed indicator drum 185, has a hub 186 that frictionally embraces the sleeve 180 and the hub has a cylindrical extension 187 that frictionally embraces the hub 188 of the large gear 179. A suitable torsion spring 190 has its outer end anchored in the fixed spindle 181 and has its inner end anchored in the indicator drum 185.

The described gearing is such that the indicator drum 185 makes one complete rotation over the range of movement of the traveling nut 159 extending from the zero position of the carriage 31 to the alternate limit position of the carriage for maximum speed of rotation of the turntable 51. The purpose of the torsion spring 190 is to exert a continuous light rotational force on the indicator drum 185 to eliminate backlash in the gear train that connects the indicator drum with the control screw 160. The speed indicator drum 185 is frictionally mounted on the sleeve 180 and on the hub of the gear 179 to permit calibration adjustment of the indicator drum as required, the frictional engagement being adequate, however, to resist the torsion spring 190.

The speed indicator drum 185, which makes one rotation for the entire range of movement of the carriage 31, has a suitable speed scale on its conical periphery 191 to be read through a small window 192 in the forward sloping wall 14. While such a speed scale is not sufficiently accurate for high precision testing, it is sufficiently accurate to determine approximate speeds of the turntable 51 and the approximate speeds may be used for guidance in a stroboscopic procedure for precise speeds determination.

The stroboscopic arrangement to supplement the speed scale on the indicator drum 185 comprises a scale 193 or series of graduations on the periphery of the turntable 51 for observation by means of a stroboscopic light (not shown) in a lamp box 194. Preferably the scale 193 has marks spaced ⅓ degree apart around the circumference of the turntable, there being a total of 1080 marks. Every third mark representing graduations of one degree is of increased length, and every 15th mark is of still greater length to indicate spacings of five degrees around the turntable. With the strobe lamp operating on 60 cycle current, the strobe-illuminated scale 193 may be used in conjunction with the speed indicator drum 185, to determine precise speeds of rotation of the turntable 51 in a well known manner.

The operation of the described apparatus may be readily understood from the foregoing description. A gyroscopic instrument to be tested for its rate-of-turn indications is fixedly mounted on the turntable 51 and connected to the various insulated conductors 71 to place the instrument in an indicator circuit for observation of its responsive signals. During the idle period preceding a test, the arm 114 is positioned with its outer reduced end portion 116 in the lower horizontal extension 119 of the slot 117 in the front wall 12, thus positioning the intermediate disc at its lower idle position shown in full lines in Figure 5. It will be noted in Figure 5 that at this lower idle position of the intermediate disc 29, the two pairs of balls 32 and 33 are out of contact with the corresponding discs 28 and 30, and therefore are not under pressure such as might cause slight flattening by plastic flow of the metal.

In preparation for operation of the turntable 51, the operator uses the handle 120 on the outer end of the arm 114 to shift the reduced end portion 116 of the arm from the lower portion 119 of the slot 117 to the upper horizontal extension 118 of the slot, this upper position being shown in Figure 9. The result of lifting the arm 114 is to lift the inner cylinder 100 inside the cylinder 85 as heretofore described and thereby lift the lower end of the concealed spring 86.

The initial upward movement of the concealed spring 86 carries the intermediate disc 29 upward to bring the pair of rollers 32 against the under surface of the input disc 28. The continued upward movement of the lower end of the concealed spring causes the spring to be compressed and exerts progressively increasing pressure against the input disc 28 until the upward pressure is greater than the weight imposed by the input disc, whereupon the input disc yields and moves upward to permit the intermediate disc 29 to lift the second pair of balls 33 into contact with the under surface of output disc 30. When the contact of the second pair of balls 33 with the output disc 30 arrests the upward movement of the intermediate disc 29, the lower end of the concealed spring 86 continues to move upward to develop increasing pressure against the under side of the output disc.

It is contemplated that the maximum lift of the lower end of the concealed spring by the lifting action of the arm 114 will be sufficient to make the upward pressure across the pair of balls 33 substantially equal to the upward pressure across the pair of balls 32. Thus if the total weight imposed on the pair of balls 32 by the input disc 28 is 35 pounds, the arrangement may be such that the concealed spring 86 will exert an upward pressure of 70 pounds at the upper position of the arm 114, one-half of this upward pressure being cancelled by the weight imposed on the pair of balls 32 and the other half of the spring pressure being transmitted upward through the second pair of balls 33. In the course of this movement of the parts caused by elevation of the arm 114, the input disc 28 moves upward over a relatively short range from the position shown in full lines in Figure 5 to an upper position with the bottom face of the disc at the level indicated by the dotted line 197 and the intermediate disc 29 shifts upward through a somewhat greater range to carry its top surface to the level indicated by the dotted line 198.

A feature of the invention is the fact that the carriage 31 is free to follow the slight vertical shift of the intermediate disc 29. When the intermediate disc drops the carriage drops correspondingly under its own weight, the leaf spring 149 yielding to permit the required spreading apart of the two guide members 137 and 139.

With the motor energized to rotate the input disc 28 and with the carriage 31 at the zero speed position shown in Figure 1, the operator manipulates the crank 161 to actuate the control screw 160 and thereby shift the carriage 31 to the right as viewed in Figure 1. It is apparent that initial shift of the pair of balls 32 radially outward from the axis of the input disc 28 will cause the two balls to transmit rotary motion from the input disc to the intermediate disc, but since the pair of balls is relatively close to the axis of the input disc and at a relatively great distance from the intermediate disc, the intermediate disc will be rotated at a much slower speed than the input disc. Since the second pair of balls 33 is initially shifted in the same manner a slight distance away from the axis of the intermediate disc, they transmit rotation from the intermediate disc to the output disc 30, but here against there is a reduction in speed arising from the fact that the two balls 33 are relatively close to the axis of the intermediate disc and relatively far from the axis of the output disc.

It is apparent that continued shift of the carriage 31 to the right as viewed in Figure 1, will carry the two pairs of balls 32 and 33 to progressively greater distances from the axes of the input disc and intermediate disc, respectively, with correspondingly greater increase in the speed transmitted to the output disc 30 for rotation of the turntable 51. At a position of the carriage placing the pair of balls 32 midway between the axes of the input disc 28 and the intermediate disc 29, the pair of balls 32 will cause the intermediate disc to rotate at the same speed as the input disc, and the second pair of balls 33 will likewise be midway between the axis of the intermediate disc 29 and the axis of the output disc 30 to cause the output disc to rotate at the same rate as the intermediate disc. Thus the speed of the output disc 30 may be varied between zero speed and the same speed as the input disc 28. It is contemplated that the motor acting through the fly wheel will operate the input disc at approximately 180 R. P. M. or 1,080 degrees of rotation per second, so that the turntable may be rotated at this maximum speed or at any desired intermediate speed ranging down to as low as approximately .01 degree per second. It is further contemplated that the motor will be reversible for the same range of rotation of the turntable in the opposite direction.

The fly wheel 39 provides stability of operation and eliminates 60 cycle vibration so that the turntable 51 rotates in an exceptionally smooth manner. Exceedingly fine changes in speed may be accomplished by slight movements of the crank 161 for slight change in the position of the carriage 31. Guided by the approximate speed values indicated on the speed indicator drum 185 and the stroboscopic illumination of the scale 193, the operator can cause the turntable 51 to rotate at precisely determined speeds for comparison with the rate of turn signals produced by the gyroscopic device under test. At the end of each test period, the arm 114 is lowered to cause the intermediate disc 29 to drop back to the full line position shown in Figure 5 thereby relieving the two pairs of balls 32 and 33 of the usual operating pressure.

My description in specific detail of the preferred embodiment of the invention by way of illustration and to teach the principles involved will suggest to those skilled in the art various changes, substitutions, and other departures from my disclosure that properly lie within the spirit and scope of the appended claims.

I claim:

1. In a variable speed device of the character described, the combination of: a first input disc; a second intermediate disc; a third output disc larger in diameter than said first disc, said three discs having parallel axes of rotation lying in a common plane, said first and third discs being adjacent each other and facing in the same direction, said second disc facing the other two discs in spaced relation thereto, said second disc intersecting the axis of said first disc, said third disc intersecting the axis of said second disc; a carriage extending adjacent the faces of said three discs, said carriage intersecting said plane and being movable along the direction of its intersection with the plane; a first pair of mutually contacting balls mounted on said carriage in peripheral contact with said first and second discs for transmitting rotation from the first disc to the second disc; a second pair of mutually contacting balls mounted on said carriage in peripheral contact with said second and third discs for transmitting rotation from the second disc to the third disc, said two pairs of balls being spaced apart to register respectively with the axis of said second disc and the axis of said first disc at a zero speed position of said carriage; and control means to shift said carriage to and from said zero position.

2. In a variable speed device of the character described, the combination of: a first input disc; a second intermediate disc; a third output disc, said three discs having parallel axes of rotation lying in a common plane, said first and third discs being adjacent each other and facing in the same direction, said second disc facing the other two discs in spaced relation thereto and overlapping the axes thereof; a carriage extending adjacent the faces of said three discs, said carriage intersecting said plane and being movable along the direction of its intersection with the plane; a first pair of mutually contacting balls mounted in said carriage in said plane in peripheral contact with said first and second discs to transmit rotation from said first disc to said second disc; a second pair of mutually contacting balls mounted in said carriage in said plane in peripheral contact with said second and third discs to transmit rotation from said second disc to said third disc; and four sets of four rollers each journaled in said carriage, each of said sets rotatably confining one of said balls of the two pairs of balls, the the axes of each of said rollers being substantially at an angle of 45 degrees from said plane to permit free rotation of said balls in said plane without sliding action between the balls and the discs or between the balls and the rollers; and control means to move said carriage.

3. A variable speed device as set forth in claim 2 in which each set of four rollers comprises two opposite pairs of rollers mounted on two corresponding brackets and in which said brackets are adjustably mounted on said carriage for placing the rollers under stress to eliminate backlash.

4. A variable speed device as set forth in claim 2 in which said pairs of balls are spaced apart to register with the axis of said second disc and the axis of one of the other two discs respectively at a zero position of said carriage.

5. In a variable speed device of the character described, the combination of: a first input disc; a second intermediate disc; a third output disc, said three discs having parallel axes of rotation, said first and third discs being adjacent each other and facing in the same direction, said second disc facing the other two discs in spaced overlapping relation thereto; a carriage extending adjacent the faces of said three discs; a first pair of mutually contacting balls rotatably mounted on said carriage in peripheral contact with said first and second discs for transmitting rotation from the first disc to the second disc; a second pair of mutually contacting balls rotatably mounted on said carriage in peripheral contact with said second and third discs for transmitting rotation from the second disc to the third disc; two wiper means associated with said two pairs of balls respectively to remove dust therefrom, each of said wiper means comprising a soft ring surrounding the points of mutual contact of the pairs of balls.

6. In a variable speed device of the character described, the combination of: a first input disc; a second intermediate disc; a third output disc, said three discs having parallel axes of rotation lying in a common substantially vertical plane, said first and third discs being adjacent each other and facing downward, said second disc facing upward in spaced overlapping relation to the other two discs, said second disc being shiftable axially; a carriage extending adjacent the faces of said three discs, a first pair of mutually contacting balls rotatably mounted on said carriage in peripheral contact with said first and second disc for transmitting rotation from the first disc to the second disc; a second pair of mutually contacting balls rotatably mounted on said carriage in peripheral contact with said second and third disc for transmitting rotation from the second disc to the third disc; control means to shift said carriage to vary the speed of said output disc; yielding means to axially support said second disc; and means to move said yielding means between a lower idle position with said pairs of balls free from pressure and an upper position at which said yielding means causes said second disc to press said pairs of balls against said first and third discs.

7. In a variable speed device of the character described, the combination of: a first input disc; a second intermediate disc; a third output disc, said three discs having parallel axes of rotation lying in a common substantially vertical plane, said first and third discs being adjacent each other and facing downward, said second disc facing upward in spaced overlapping relation to the other two discs, one of said downwardly facing discs having a given small range of axial movement downward from its operating position to a lower idle position, said second disc having a greater range of axial movement downward from its operating position to a lower idle position; a carriage extending adjacent the faces of said three discs; a first pair of mutually contacting balls rotatably mounted on said carriage in peripheral contact with said first and second disc for transmitting rotation from the first disc to the second disc; a second pair of mutually contacting balls rotatably mounted on said carriage in peripheral contact with said second and third disc for transmitting rotation from the second disc to the third disc; control means to shift said carriage to vary the speed of said output disc; means to support said second disc in its operating position thereby to act through one of said pairs of balls to support the axially movable downwardly facing disc in its operating position, said support means being movable from an upper operating position to a lower idle position to permit the two axially movable discs to drop to their idle positions with said one pair of balls relieved of the weight of the axially movable downwardly facing disc, and with the other pair of balls released from pressure against the other downwardly facing disc.

8. A variable speed device as set forth in claim 7 in which said support means is a yielding support means to exert upward pressure whereby while said one pair of balls is under pressure from the weight of said axially movable downwardly facing disc, the other pair of balls is under pressure from the yielding means.

9. A variable speed device as set forth in claim 8 in which the upward pressure of said yielding support means is on the order of magnitude of twice the weight imposed by the axially movable downwardly facing disc whereby the pressure on the two pairs of balls is substantially equalized.

10. In a variable speed device of the character described, the combination of: a first input disc; a second intermediate disc; a third output disc, said three discs having parallel axes of rotation, said first and third discs being adjacent each other and facing in the same direction, said second disc facing the other two discs in spaced overlapping relation thereto; a carriage extending adjacent the faces of said three discs, said carriage having outwardly facing longitudinal guide ways on its opposite sides; two guide means, one on each side of said carriage, said two guide means having inwardly facing guide ways paired with the carriage guide ways; a plurality of guide balls in each of said pairs of guide ways; and yielding means urging at least one of said guide means laterally toward said carriage thereby to take up backlash on both sides of the carriage; a first pair of mutually contacting balls rotatably mounted on said carriage in peripheral contact with said first and second discs for transmitting rotation from the first disc to the second disc; a second pair of mutually contacting balls rotatably mounted on said carriage in peripheral contact with said second and third discs for transmitting rotation from the second disc to the third disc; and control means to shift said carriage to vary the speed of said output disc.

11. A variable speed device as set forth in claim 10 in which each of said guide ways has convergent walls.

12. A variable speed device as set forth in claim 10 in which said yielding means comprises leaf spring means pressing against spaced points on one of said guide means.

13. A variable speed device as set forth in claim 12 in which said control means is operatively connected with said carriage by screw means and which includes yielding means in opposition to said screw means to eliminate backlash.

14. In a variable speed device of the character described, the combination of: a first input disc; a second intermediate disc; a third output disc, said three discs having parallel axes of rotation lying in a common substantially vertical plane, said first and third discs being adjacent each other and facing downward, said second disc facing upward in spaced overlapping relation to the other two discs; a carriage extending adjacent the faces of the three discs, said carriage intersecting said plane and being movable along the direction of its intersection with the plane, said carriage having outwardly facing longitudinal guide ways on its opposite sides; two guide means, one on each side of said carriage, said guide means having inwardly facing guide ways paired with the carriage guide ways; a plurality of guide balls in each of said pairs of guide ways; yielding means urging at least one of said guide means laterally toward said carriage thereby to take up backlash on both sides of the carriage; a first pair of mutually contacting balls in peripheral contact with said first and second discs for transmitting rotation from the first disc to the second disc; a second pair of mutually contacting balls in peripheral contact with said second and third discs for transmitting rotation from the second disc to the third disc; four sets of four rollers each journaled in said carriage, each set rotatably confining one of said balls, the planes of rotation of said rollers being substantially at angles of 45 degrees from said plane to permit free rotation of said balls in said plane without sliding action between the balls and the discs or between the balls and the rollers, said first disc having a given small range of axial movement downward from its operating position to a lower idle position, said second disc having a greater range of axial movement downward from its operating position to a lower idle position; means to support said second disc in its operating position thereby to act through one of said pairs of balls to support said first disc in its operating position, said support means being movable from an upper operating position to a lower idle position to permit said second and first discs to drop to their idle position with said one pair of balls relieved of the weight of said first disc, and with other pair of balls released from pressure against said third disc; and control means to move said carriage.

15. In a variable speed device of the character described, the combination of: a first input disc; a second intermediate disc; a third output disc, said first and third discs being adjacent each other and facing in the same direction, said second disc facing the other two discs in spaced relation thereto, one of said first and third discs being relatively large and the other relatively small, said relatively large disc intersecting the axis of said second disc, said second disc intersecting the axis of said relatively small disc; a carriage extending adjacent the faces of said three discs, said carriage being movable along the faces of the three discs; a first ball means mounted on said carriage in peripheral contact with said first and second discs for transmitting rotation from the first disc to the second disc; a second ball means mounted on said carriage in peripheral contact with said second and third discs for transmitting rotation from the second disc to the third disc, said two ball means being spaced apart to register respectively with the axis of said second disc and the axis of said relatively small disc at a zero speed position on said carriage; and control means to shift said carriage to and from said zero position.

References Cited in the file of this patent

UNITED STATES PATENTS

| | | |
|---|---|---|
| 1,398,417 | Chicken | Nov. 29, 1921 |
| 1,864,677 | Sparkes | June 28, 1932 |
| 2,407,996 | Nies | Sept. 24, 1946 |
| 2,422,306 | Laing | June 17, 1947 |

FOREIGN PATENTS

| | | |
|---|---|---|
| 606,563 | France | Mar. 12, 1926 |